(12) United States Patent
Deng et al.

(10) Patent No.: US 11,815,623 B2
(45) Date of Patent: *Nov. 14, 2023

(54) SINGLE FRAME 4D DETECTION USING DEEP FUSION OF CAMERA IMAGE, IMAGING RADAR AND LIDAR POINT CLOUD

(71) Applicant: NIO Technology (Anhui) Co., Ltd., Anhui (CN)

(72) Inventors: Huazeng Deng, San Jose, CA (US); Ajaya H S Rao, San Jose, CA (US); Ashwath Aithal, Fremont, CA (US); Xu Chen, Livermore, CA (US); Ruoyu Tan, Millbrae, CA (US); Veera Ganesh Yalla, Sunnyvale, CA (US)

(73) Assignee: NIO Technology (Anhui) Co., Ltd., Anhui (CN)

( * ) Notice: Subject to any disclaimer, the term of this patent is extended or adjusted under 35 U.S.C. 154(b) by 53 days.

This patent is subject to a terminal disclaimer.

(21) Appl. No.: 17/462,936

(22) Filed: Aug. 31, 2021

(65) Prior Publication Data

US 2021/0397880 A1 Dec. 23, 2021

Related U.S. Application Data

(63) Continuation of application No. 16/781,672, filed on Feb. 4, 2020, now Pat. No. 11,113,584.

(51) Int. Cl.
*G06T 7/00* (2017.01)
*G01S 7/40* (2006.01)
(Continued)

(52) U.S. Cl.
CPC ........ *G01S 7/40* (2013.01); *G01S 7/41* (2013.01); *G01S 7/417* (2013.01); *G01S 13/42* (2013.01);
(Continued)

(58) Field of Classification Search
CPC ... G01S 7/40; G01S 7/41; G01S 7/417; G01S 13/42; G01S 13/865; G01S 13/867;
(Continued)

(56) References Cited

U.S. PATENT DOCUMENTS 10,013,773 B1 * 7/2018 Ogale ................. G06N 3/084
10,275,691 B2 * 4/2019 Wang ................. G06V 10/454
(Continued)

OTHER PUBLICATIONS

U.S. Appl. No. 15/687,247, filed Aug. 25, 2017, Hotson et al.
(Continued)

*Primary Examiner* — Ping Y Hsieh
(74) *Attorney, Agent, or Firm* — Sheridan Ross, PC

(57) ABSTRACT

Embodiments of the present disclosure are directed to a method for object detection. The method includes receiving sensor data indicative of one or more objects for each of a camera subsystem, a LiDAR subsystem, and an imaging RADAR subsystem. The sensor data is received simultaneously and within one frame for each of the subsystems. The method also includes extracting one or more feature representations of the objects from camera image data, LiDAR point cloud data and imaging RADAR point cloud data and generating image feature maps, LiDAR feature maps and imaging RADAR feature maps. The method further includes combining the image feature maps, the LiDAR feature maps and the imaging RADAR feature maps to generate merged feature maps and generating object classification, object position, object dimensions, object heading and object velocity from the merged feature maps.

20 Claims, 13 Drawing Sheets

(51) Int. Cl.
- *G01S 13/86* (2006.01)
- *G01S 7/41* (2006.01)
- *G01S 13/42* (2006.01)
- *G06T 7/80* (2017.01)
- *G06T 7/70* (2017.01)
- *G06T 7/20* (2017.01)
- *G06T 7/62* (2017.01)
- *G06V 20/56* (2022.01)
- *G06F 18/25* (2023.01)
- *G06F 18/24* (2023.01)
- *G06V 10/764* (2022.01)
- *G05D 1/02* (2020.01)
- *G05D 1/00* (2006.01)

(52) U.S. Cl.
CPC .......... *G01S 13/865* (2013.01); *G01S 13/867* (2013.01); *G06F 18/24* (2023.01); *G06F 18/253* (2023.01); *G06T 7/20* (2013.01); *G06T 7/62* (2017.01); *G06T 7/70* (2017.01); *G06T 7/80* (2017.01); *G06V 10/764* (2022.01); *G06V 20/56* (2022.01); *G05D 1/0088* (2013.01); *G05D 1/0231* (2013.01); *G05D 1/0251* (2013.01); *G05D 1/0257* (2013.01); *G05D 2201/0213* (2013.01); *G06T 2207/10028* (2013.01); *G06T 2207/10044* (2013.01); *G06T 2207/20084* (2013.01); *G06T 2207/30252* (2013.01)

(58) Field of Classification Search
CPC ................... G01S 7/4802; G01S 17/58; G01S 2013/93185; G01S 13/726; G01S 2013/9318; G01S 2013/9319; G01S 13/589; G01S 13/87; G01S 17/86; G01S 17/89; G01S 2013/93273; G01S 13/862; G01S 13/931; G01S 2013/93274; G01S 2013/93277; G01S 17/931; G01S 2013/932; G01S 2013/9322; G01S 7/497; G01S 2013/93271; G01S 2013/93272; G01S 17/931; G01S 13/89; G01S 2013/9316; G06F 18/24; G06F 18/253; G06T 7/20; G06T 7/62; G06T 7/70; G06T 7/80; G06T 2207/10028; G06T 2207/10044; G06T 2207/20084; G06T 2207/30252; G06V 10/764; G06V 20/56; G05D 1/0088; G05D 1/0231; G05D 1/0251; G05D 1/0257; G05D 2201/0213
See application file for complete search history.

(56) References Cited

U.S. PATENT DOCUMENTS

| 11,113,584 | B2 | 9/2021 | Deng et al. | |
|---|---|---|---|---|
| 2018/0211128 | A1* | 7/2018 | Hotson | G06V 10/764 |
| 2019/0065910 | A1* | 2/2019 | Wang | G06V 20/41 |
| 2021/0110600 | A1* | 4/2021 | Serafin | G06T 17/05 |

OTHER PUBLICATIONS

U.S. Appl. No. 16/240,666, filed Jan. 4, 2019, Harrison.
Simonyan et al., "Very Deep Convolutional Networks for Large-Scale Image Recognition," Apr. 10, 2015, Published as a conference paper at ICLR 2015, arXIv:1409.1556v6 [cs.CV] Apr. 10, 2015, 14 pages.
Qi et al., "PointNet++: Deep Hierarchical Feature Learning on Point Sets in a Metric Space," paper, Stanford University, arXiv:1706.02413v1 [cs.CV] Jun. 7, 2017, 14 pages.
Notice of Allowance for U.S. Appl. No. 16/781,672, dated May 3, 2021 8 pages.

* cited by examiner

SINGLE FRAME 4D DETECTION USING DEEP FUSION OF CAMERA IMAGE, IMAGING RADAR AND LIDAR POINT CLOUD

CROSS REFERENCE TO RELATED APPLICATIONS

This application is a continuation of and claims priority to U.S. patent application Ser. No. 16/781,672 filed Feb. 4, 2020, of the same title, the entire disclosures of which are hereby incorporated by reference, in their entirety, for all that they teach and for all purposes.

FIELD

The present disclosure is generally directed to vehicle methods and systems and more particularly to vehicle methods and systems for detecting objects using camera data, imaging radio detection and ranging (RADAR) data and light detection and ranging (LiDAR) data from a single frame representing a scene from a route being navigated by the vehicle.

BACKGROUND

Vehicle navigation systems typically provide a display including a graphical representation of a map that indicates a current geographical position of a vehicle on the map as the map moves. Vehicles use sensors to provide information about the surroundings of the vehicle such as detecting objects. This information is used to augment or automate vehicle operations. Sensors include, but are not limited to, RADAR sensors, camera sensors, LiDAR sensors, etc. RADAR systems provide a RADAR point cloud of radio-reflective points and LiDAR systems provide a LiDAR point cloud of reflective points, wherein the LiDAR point cloud is much denser than the RADAR point cloud and provides a better resolution. Object detection aims to classify objects, determine the position of objects, and determine the dimensions of objects. Traditional two-dimensional (2D) object detection relies on camera images to obtain the two dimensions of objects (i.e., length information and width information) but with no depth information. Traditional three-dimensional (3D) object detection relies on LiDAR point cloud information and/or stereo camera information to obtain the position of the object (e.g., defined by the X,Y,Z coordinate points), the dimensions of the object (i.e., length, width, height), and the orientation of the object. 2D/3D object detection can be achieved using computer vision and machine learning algorithms. Remarkable progress has been achieved in 2D object detection with deep learning. However, 2D object detection algorithms have not been transferred well for 3D object detection due to the lower resolutions of 3D input data and the high complexity of estimating oriented bounding box around the objects.

Generally, a single frame of a LiDAR point cloud data and a single frame of stereo camera image data only provides 3D position and dimension information for the objects. A tracking algorithm (e.g., Kalman filter, particle filter, etc.) is then required to derive the velocities of the objects using multiple frames.

Conventional RADAR sensors (e.g., Bosch Gen4, Conti ARS430, etc.) provide very coarse resolutions and do not include elevation angle information. Conventional RADAR systems output a list of track objects, and these track objects are further associated and fused with the object detection results from LiDAR and camera systems. Next generation imaging RADAR systems provide much higher resolutions (e.g., less than 1° in azimuth and elevation angle resolution) and include elevation angle information as well. Moreover, each frame of imaging RADAR detection includes doppler information for the object from which the velocity of the object can be determined.

Accordingly, there is a need for improved methods and systems for detecting objects, as well as estimating their velocities, in a single frame for each simultaneously transmitted camera image data, LiDAR point cloud data, and imaging RADAR point cloud data.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

The following detailed description refers to the accompanying drawings. The same reference numbers in different drawings may identify the same or similar elements.

Figure 1:
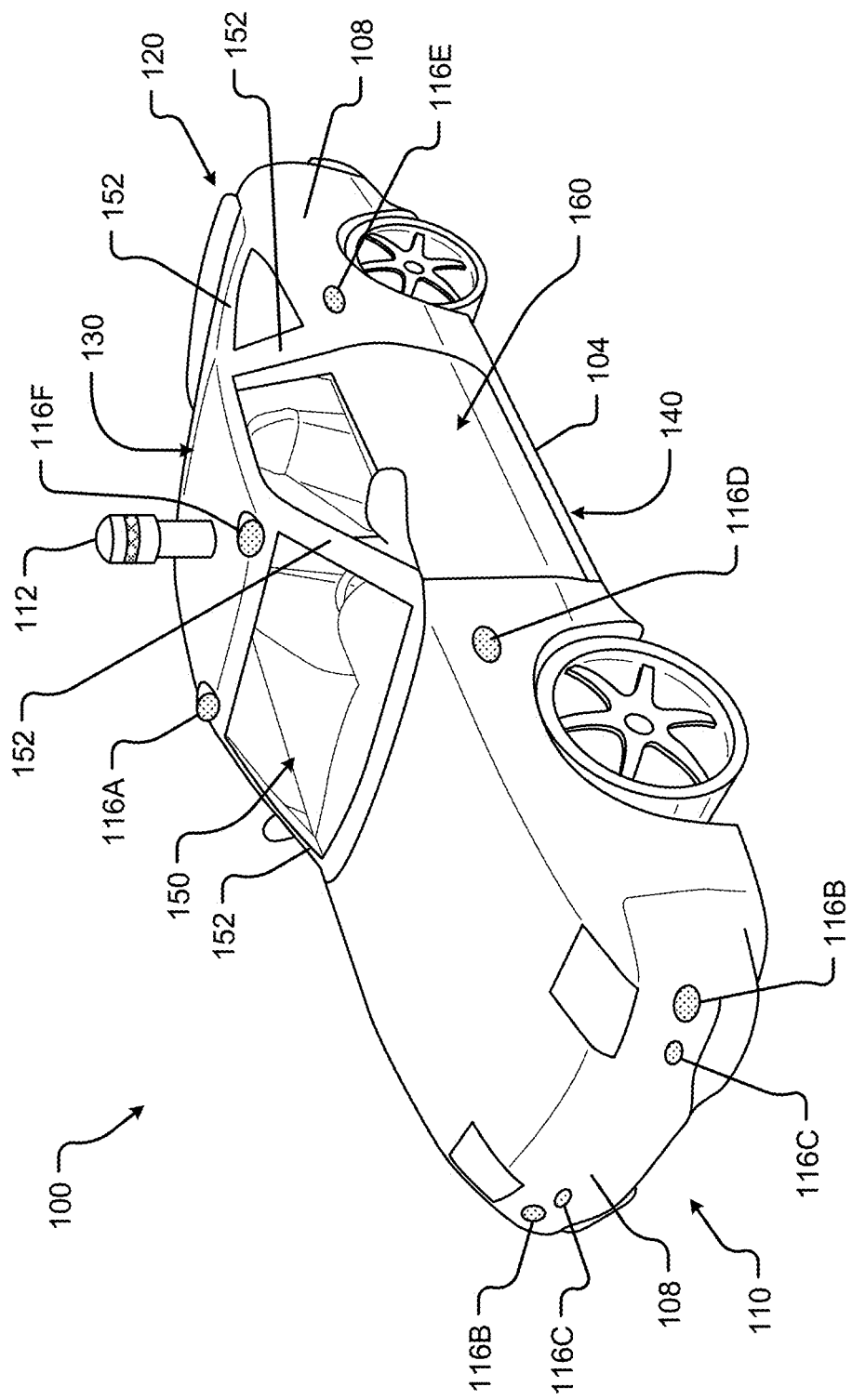
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), radio detection and ranging (RADAR) sensors (e.g., object-detection sensors and/or systems), light detection and ranging (LiDAR) sensors and/or systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LiDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LiDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
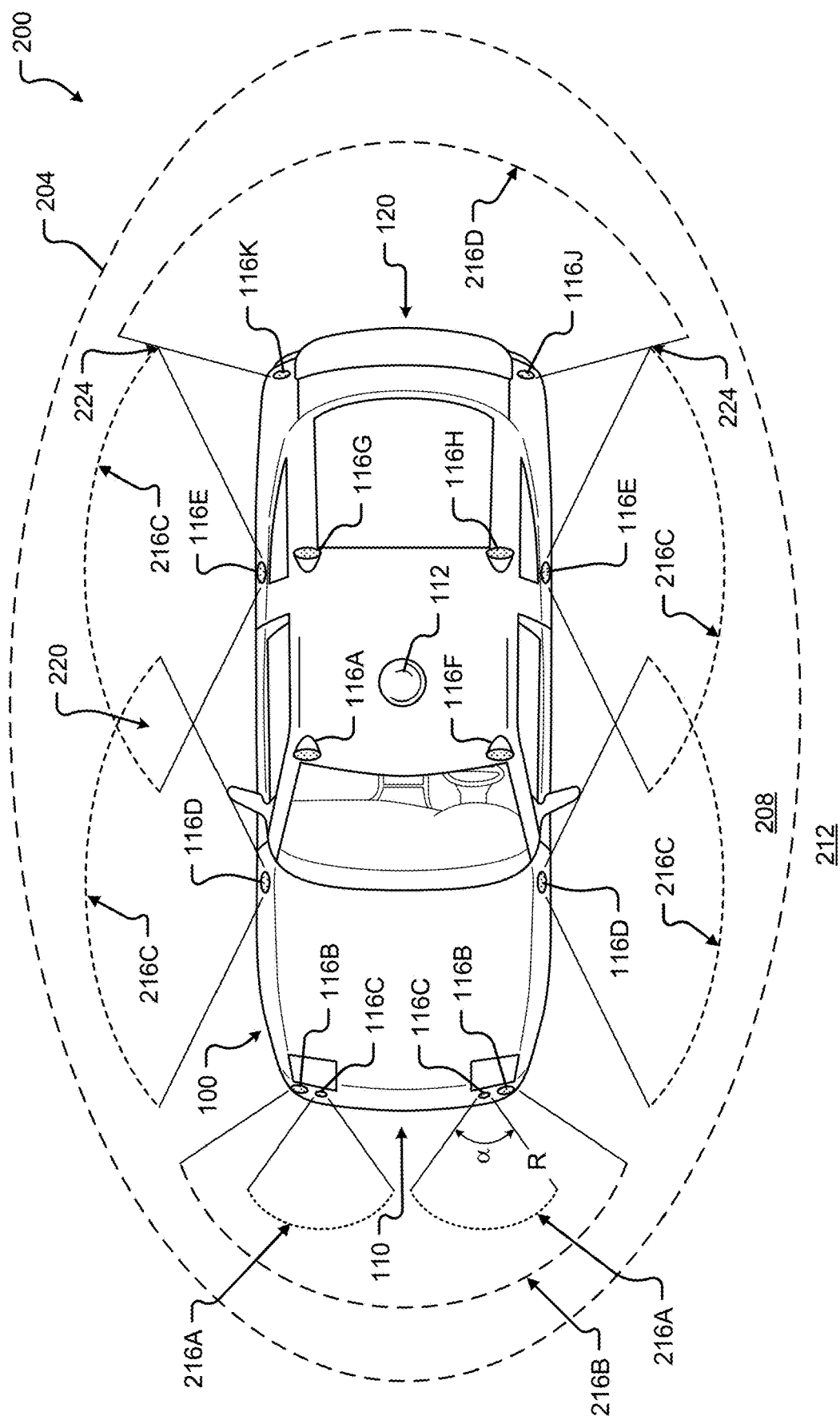
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LiDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LiDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
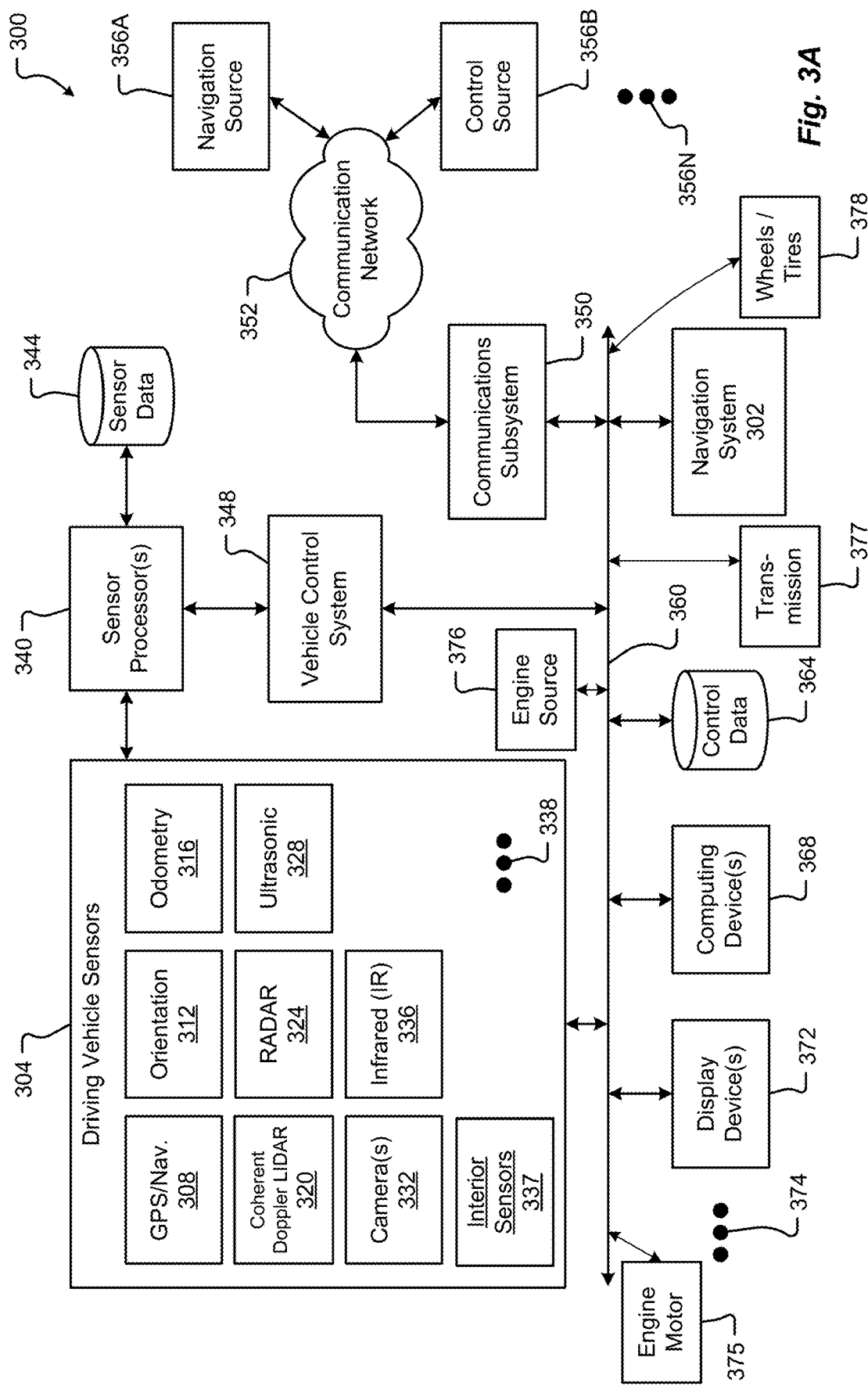
FIG. 3A is a block diagram of an embodiment of a communication environment of the vehicle in accordance with embodiments of the present disclosure.
Figure 3B:
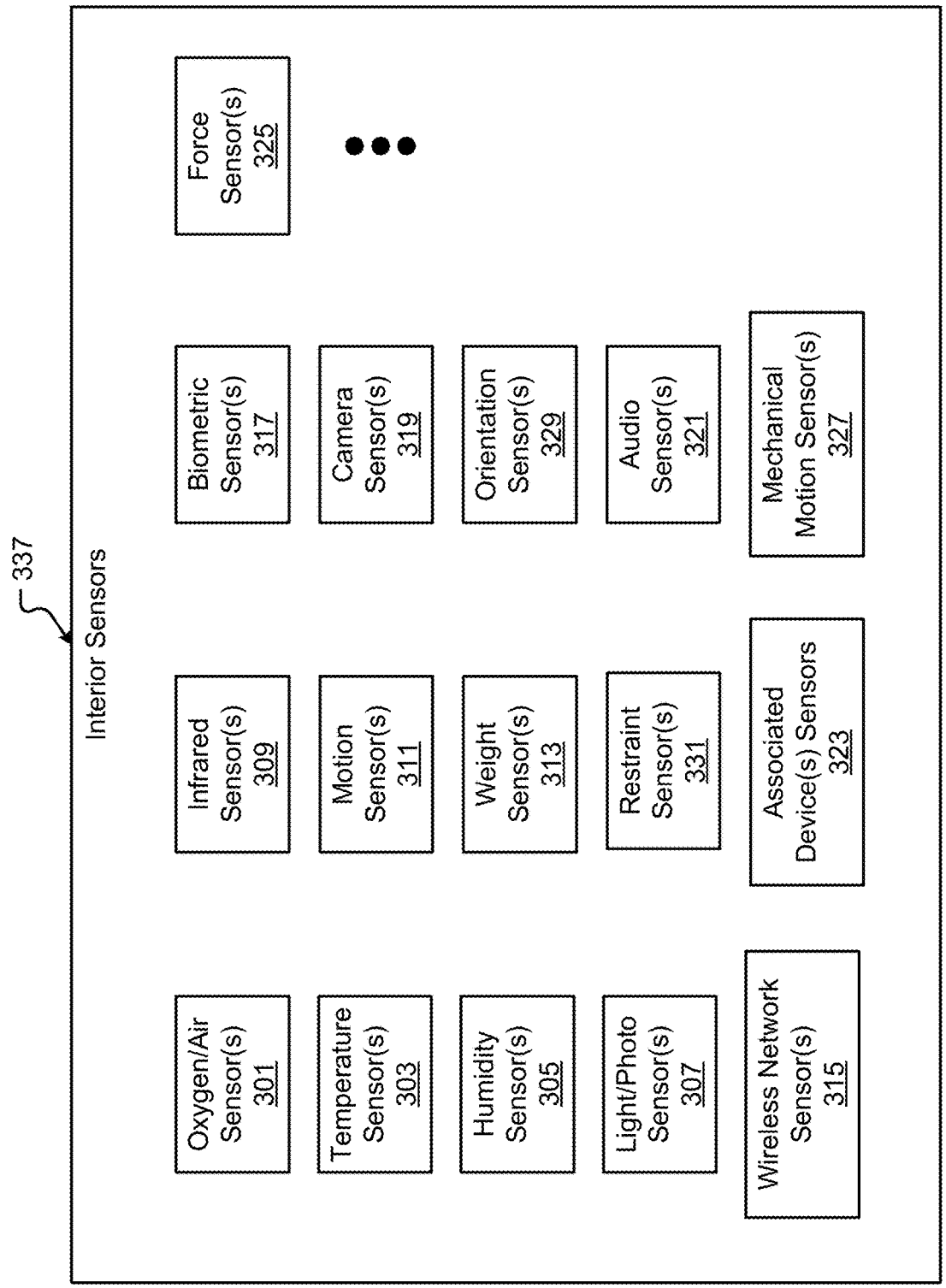
FIG. 3B is a block diagram of an embodiment of interior sensors within the vehicle in accordance with embodiments of the present disclosure.
Figure 3C:
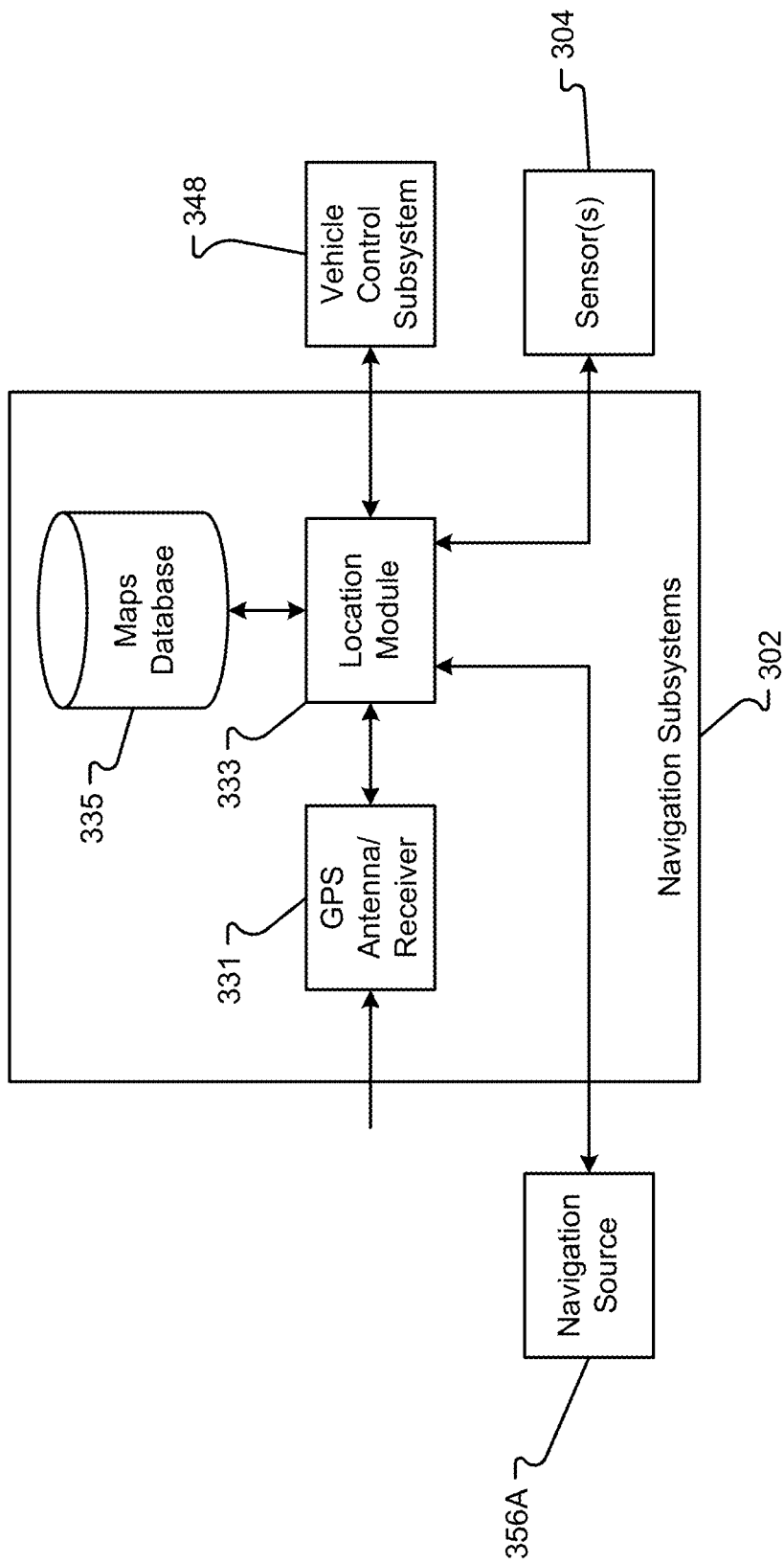
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360.

In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LiDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the orientation sensor 312 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LiDAR sensor/system 320 may include one or more components configured to measure distances to targets using laser illumination. In some embodiments, the LiDAR sensor/system 320 may provide 3D imaging data of an environment around the vehicle 100. The imaging data may be processed to generate a full 360-degree view of the environment around the vehicle 100. The LiDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LiDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LiDAR sensor/system 320 may detect when light from the plurality of laser beams emitted into the measurement environment returns (e.g., reflected echo) to the LiDAR sensor/system 320. The LiDAR sensor/system 320 may calculate, based on a time associated with the emission of light to the detected return of light, a distance from the vehicle 100 to the illuminated target. In some embodiments, the LiDAR sensor/system 320 may generate over 2.0 million points per second and have an effective operational range of at least 100 meters. Examples of the LiDAR sensor/system 320 as described herein may include, but are not limited to, at least one of Velodyne® LiDAR™ HDL-64E 64-channel LiDAR sensors, Velodyne® LiDAR™ HDL-32E 32-channel LiDAR sensors, Velodyne® LiDAR™ PUCK™ VLP-16 16-channel LiDAR sensors, Leica Geosystems Pegasus:Two mobile sensor platform, Garmin® LiDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LiDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning RADAR sensors, Fujitsu Ten Ltd. Automotive Compact 77 GHz 3D Electronic Scan Millimeter Wave RADAR sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly lit environments. The IR sensors 336 may include an IR light emitting element (e.g., IR light emitting diode (LED), etc.), and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally, or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally, or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LiDAR and RADAR sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long-range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
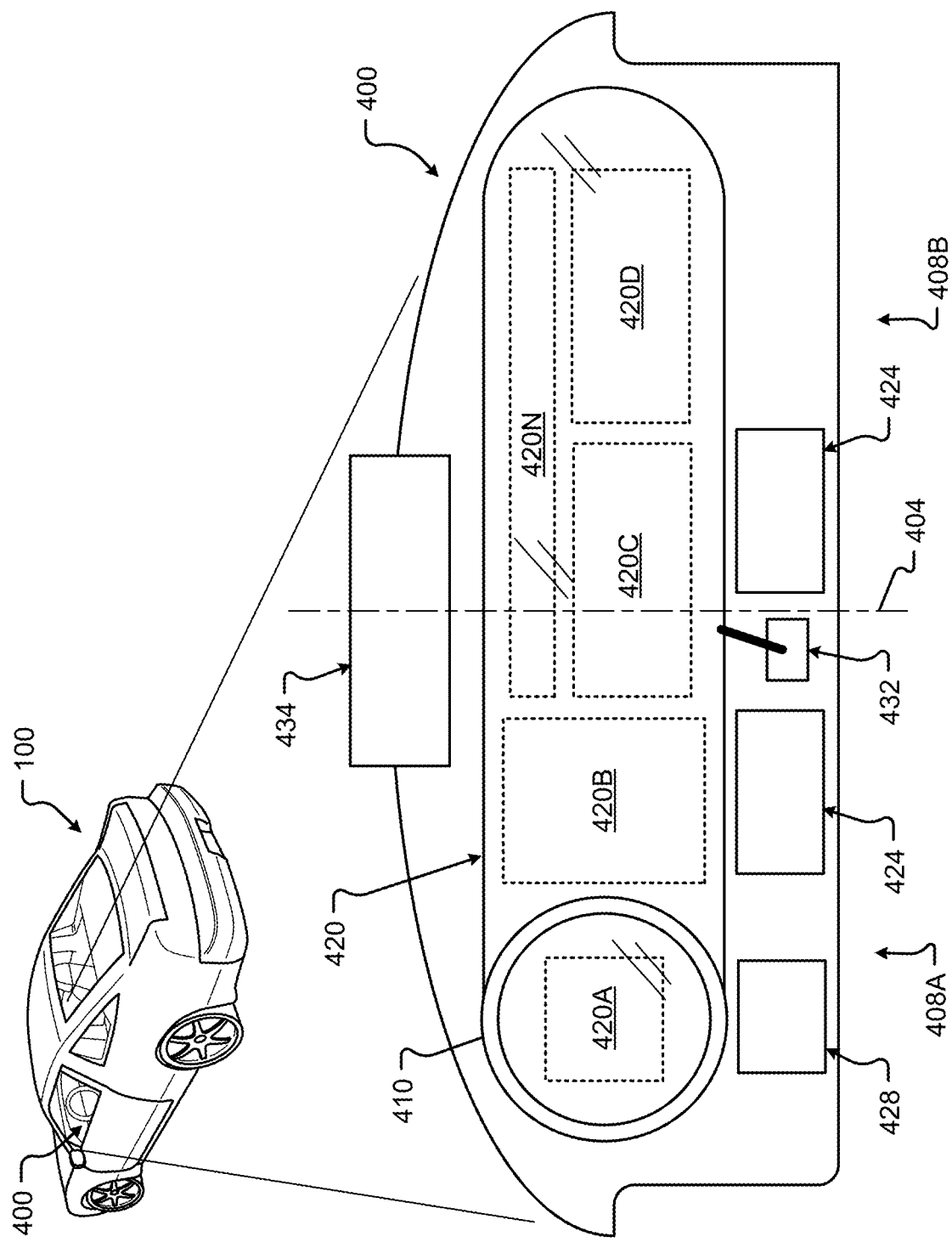
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally, or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally, or alternatively, the number of portions 420A-N used to visually present information via the operational display 420 may be dynamically increased or decreased as required and are not limited to the configurations shown.

Figure 5:
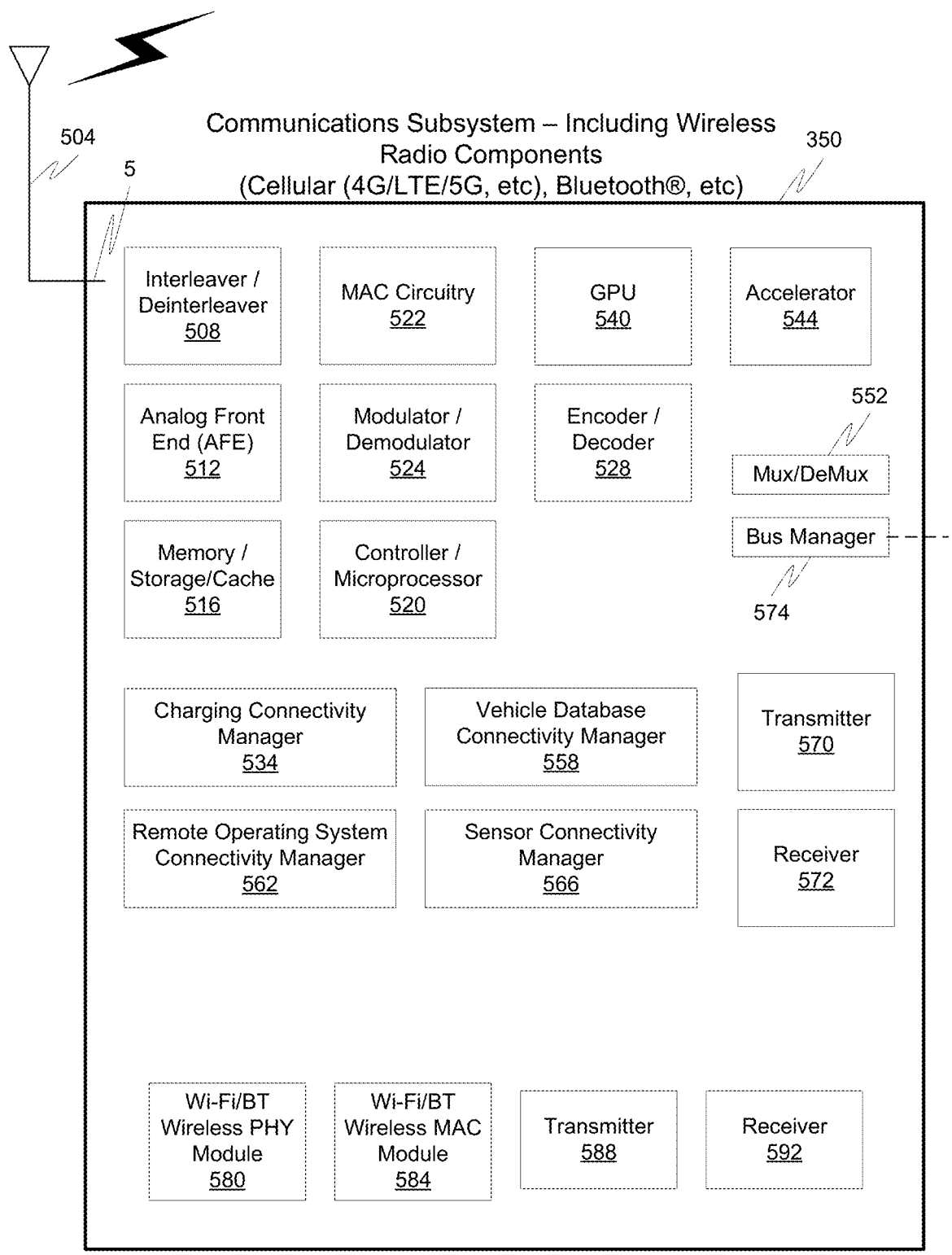
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety.)

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties, and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
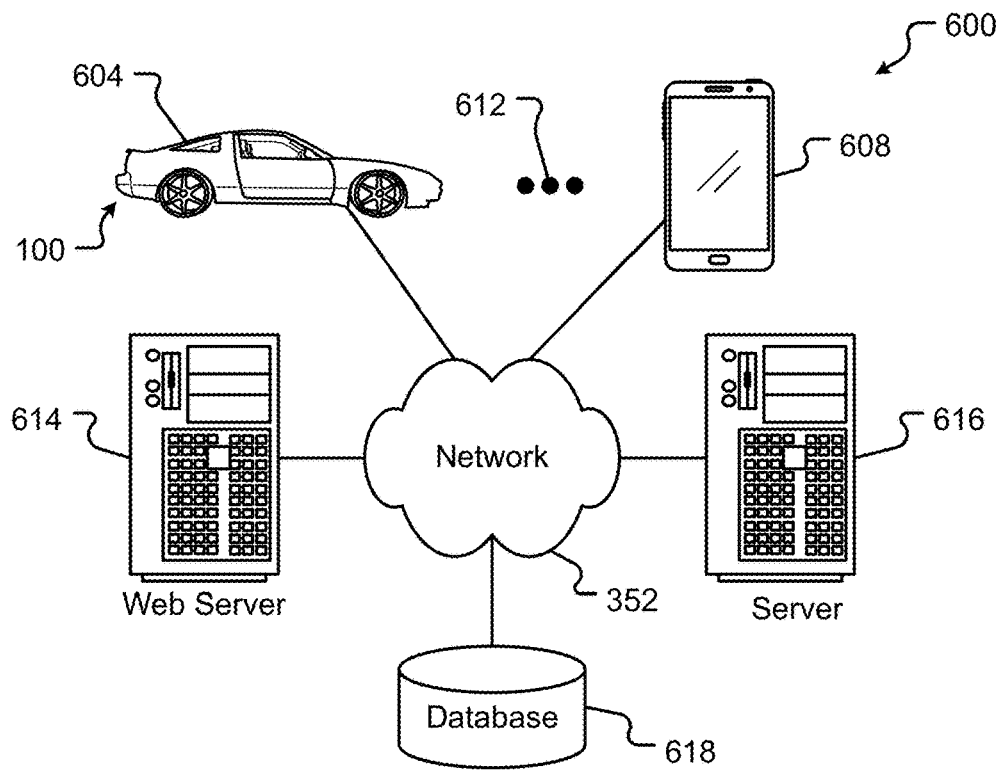
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
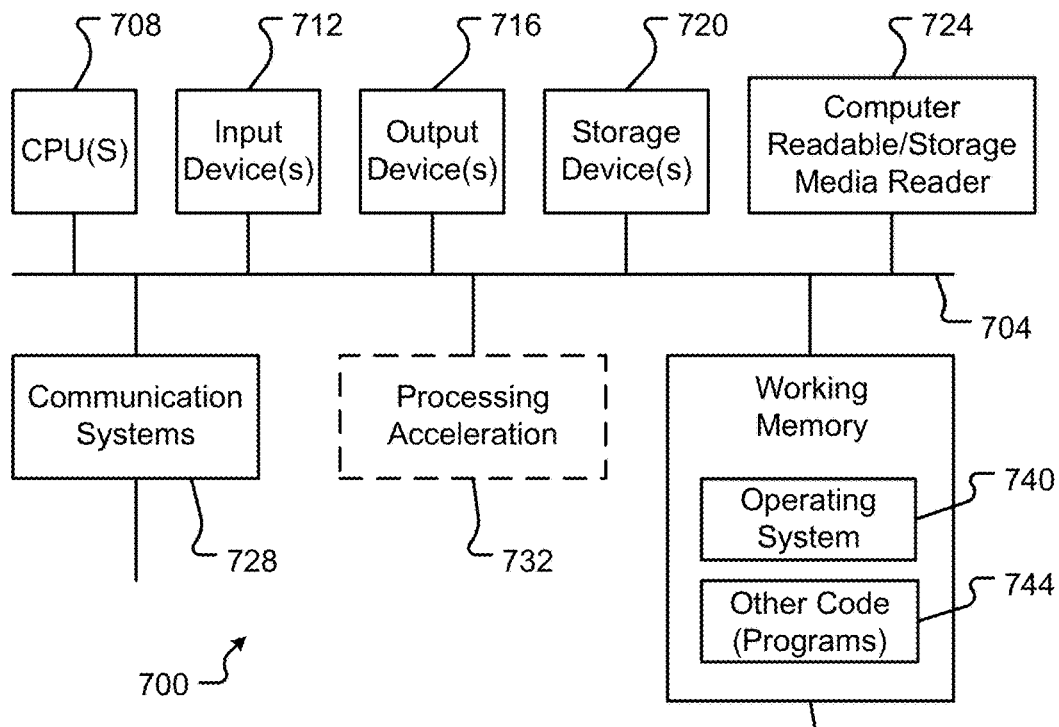
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random-access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Embodiments of the present disclosure are directed to object detection and the detection of the velocities of the objects. More specifically, embodiments of the present disclosure are directed to four-dimensional (4D) object detection (i.e., X,Y,Z, v) where the (x,y,z) information represents the position of an object and the (v) information represents the velocity of the object.

Figure 8:
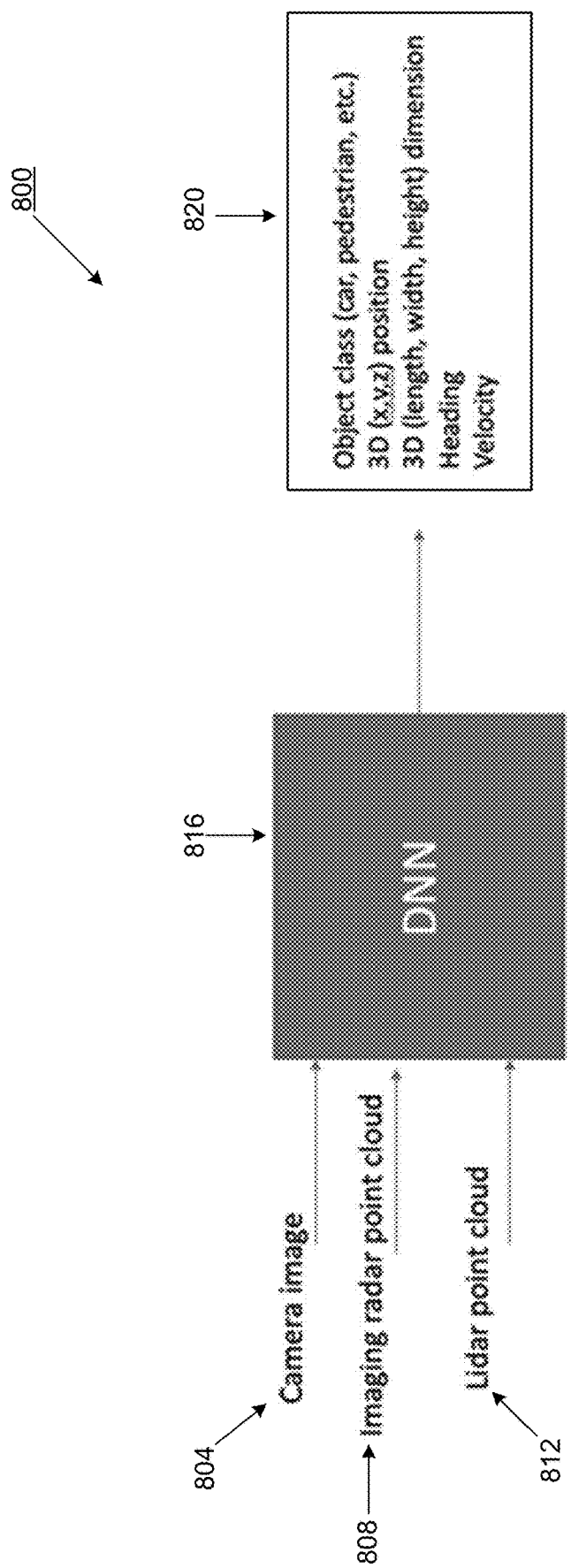
FIG. 8 is a block diagram of a four-dimensional (4D) object detection system using camera, imaging RADAR and LiDAR fusion in accordance with embodiments of the present disclosure.

FIG. 8 is a block diagram of a four-dimensional (4D) object detection system 800 using camera data, imaging RADAR data and LiDAR data fusion in accordance with embodiments of the present disclosure. The system 800 includes a deep neural network (DNN) 816 which receives inputs 804, 808, 812 and provides an output 820. In general, neural networks are a set of algorithms, modeled loosely after the human brain, that are designed to recognize patterns. They interpret sensory data through a kind of machine perception, labeling or clustering raw input. The patterns they recognize are numerical, contained in vectors, into which all real-world data, be it images, sound, text or time series, must be translated. Neural networks help to cluster and classify data which assists in grouping unlabeled or unstructured data according to similarities among the example inputs and classify data when the data have a labeled dataset on which to train.

Neural networks can also extract features that are fed to other algorithms for clustering and classification. DNNs are components of larger machine-learning applications involving algorithms for reinforcement learning, classification, and regression. The DNNs have an input layer, an output layer and at least one hidden layer in between. Each layer performs specific types of sorting and ordering in a process that is referred to as "feature hierarchy." Deep learning is also associated the with DNNs, as deep learning represents a specific form of machine learning where technologies using aspects of artificial intelligence seek to classify and order information in ways that go beyond simple input/output protocols. Although DNN 816 is used in this example embodiment of the present disclosure, other complex and sophisticated algorithms can be used without departing from the spirit and scope of the present disclosure. For example, other types of conventional detection algorithms or equivalent algorithms can be used. DNN 816 is stored for example, in one or more of the processors/computers such as sensor processor(s) 340, computing device(s) 368, vehicle computing device 604, communication devices 608 and 612, CPU 708 and/or servers 614 and 616.

A single frame of each of camera image 804 data, imaging RADAR point cloud 808 data and LiDAR point cloud 812 data are simultaneously received as inputs to DNN 816. A camera image is a set of pixels and each pixel contains information of R, G, B values. The LiDAR point cloud is a combination of points and each point contains X,Y,Z location information and reflection intensity of the point. A RADAR point cloud is a combination of detected points from the targets and the environment. Each point contains location information X,Y,Z, location of a point, reflection intensity of the point as well as a Doppler velocity between the point and the RADAR device. The single frame of camera image 804 data is provided by camera sensor 332 and the single frame of imaging RADAR point cloud 808 data is provided by the RADAR sensor 324. The single frame of LiDAR point cloud 812 data is provided by LiDAR sensor 320. Each of the single frames of camera image 804 data, imaging RADAR point cloud 808 data and LiDAR point cloud 812 data is synchronized such that each frame is taken at the same time and in the same location representing a scene from a route being navigated by the vehicle 100. After processing by the one or more processors/computers identified above utilizing DNN 816, output 820 includes the following parameters for detected objects: object classification (e.g., car, pedestrian, etc.); 3D position of the object (e.g., X,Y,Z coordinates of the object); 3D dimensions of the object (e.g., length, width, height of the object); the direction of the object (e.g., heading); and the velocity of the object.

As for the imaging RADAR point cloud 808, a detected point of an object has location (x,y) and velocity (v) at a certain heading. Here the term "heading" is defined as the angle between the direction the is pointing and the horizontal x-axis on a bird's eye view plane. The Doppler velocity of this point is calculated by Equation 1 as follows:

$$\text{Doppler velocity} = \frac{v * \cos(\text{heading}) * x + v * \sin(\text{heading}) * y}{\sqrt{x^2 + y^2}}. \quad (1)$$

If an imaging RADAR detects multiple reflecting points from an object surface, the Doppler information carries the target velocity information. Moreover, the Doppler information is subject to some measurement noise.

The camera image 804 data requires more computing power to analyze all of the camera data, but can detect colors and interpret text such as reading road signs. In general, camera sensors can perceive color and textual information from an environment and are good at classifying objects, but their detection range is limited, and they perform poorly in limited lighting or adverse weather conditions. The imaging RADAR point cloud 808 data can still provide information in the snow, rain, or fog since RADAR sensors are resistant to bad weather conditions where cameras and LiDARs will not work. In general, RADAR sensor provides precise distance and velocity information and work well in inclement weather conditions but have a rather low resolution. Although LiDAR point cloud 812 data can identify some shapes, camera sensors have a distinct advantage. In general, LiDAR sensor provide precise distance information, have ranges that can exceed 100 meter and are able to detect small objects. LiDAR sensors also work well at night but do not provide color information and their performance decreases in heavy rain.

Figure 9:
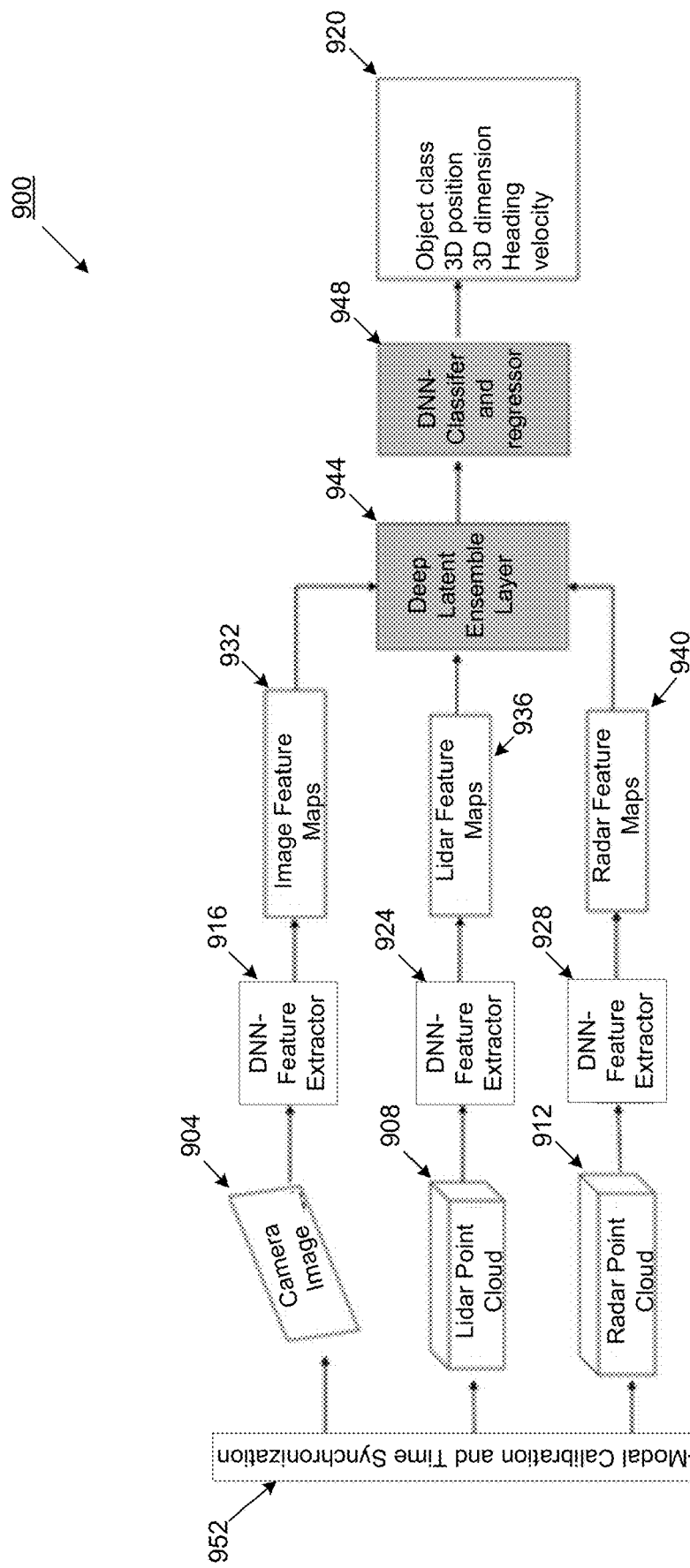
FIG. 9 is a block diagram of an example deep neural network (DNN) architecture for fusing LiDAR, imaging RADAR and camera inputs in accordance with embodiments of the present disclosure.

FIG. 9 is a block diagram of an example DNN architecture 900 for fusing LiDAR, imaging RADAR and camera inputs in accordance with embodiments of the present disclosure. The architecture 900 includes multi-modal calibration and time synchronization block 952, camera image 904 data, LiDAR point cloud 908 data, imaging RADAR point cloud 912 data, DNN feature extractors 916, 924 and 928, image feature maps 932, LiDAR feature maps 936, imaging RADAR feature maps 940, deep latent ensemble layer 944, DNN classifier and regressor 948, and output 920. Although DNN feature extractors 916, 924 and 928, deep latent ensemble layer 944, and DNN classifier and regressor 948 are used in this example embodiment of the present disclosure, other complex and sophisticated algorithms can be used without departing from the spirit and scope of the present disclosure. For example, conventional 2D radar imaging algorithms such as Range-Doppler algorithm can be used. Additional feature extraction algorithms include, but are not limited to, Histogram of Oriented Gradients (HOG), Scale Invariant Feature Transform (SIFT) and Speeded-Up Robust Feature (SURF). Additional classification and regressor algorithms include, but are not limited to, Decision Tree (DT) and Support Vector Machine (SVM). A clustering algorithm for object detection may include Density-based Clustering of Applications with Noise (DBCAN). The DNN feature extractors 916, 924 and 928, deep latent ensemble layer 944 and DNN classifier and regressor 948 are stored for example, in one or more of the processors/computers such as sensor processor(s) 340, computing device(s) 368, vehicle computing device 604, communication devices 608 and 612, CPU 708, and/or servers 614 and 616. Multi-modal calibration and time synchronization block 952 calibrates and synchronizes each of the camera sensor 332, RADAR sensor 324 and LiDAR sensor 320 such that a single frame of each of camera image 904 data, imaging RADAR point cloud 908 data and LiDAR point cloud 912 data are simultaneously captured and provided as inputs to the DNN feature extractors 916, 924, and 928, respectively. Calibration of the camera sensor 332, RADAR sensor 324 and LiDAR sensor 320 include intrinsic and extrinsic calibration of these sensors.

The DNN feature extractors 916, 924, and 928 extract feature representations of objects separately from the camera image 904 data, imaging RADAR point cloud 908 data and LiDAR point cloud 912 data, respectively. The feature extractor is a method that selects and/or combines variable into features effectively reducing the amount of input sensor data that has to be processed, while still accurately and completely describing the original data set. The output from the DNN feature extractor 916 produces image feature maps 932, the output from the DNN feature extractor 924 produces LiDAR feature maps 936, and the output from the DNN feature extractor 928 produces imaging RADAR feature maps 940. The image feature maps 932, the LiDAR feature maps 936, and the imaging RADAR feature maps 940 are feature vectors which are each input to the deep latent ensemble layer 944 for further processing. According to embodiments of the present disclosure, the feature vectors of the image feature maps 932, the LiDAR feature maps 936, and the imaging RADAR feature maps 940 have the same dimension. For example, the output of the last layer of the feature extractors for each of the feature extractors 916, 924, and 928 should result in a 3D feature tensor (e.g., matrix) which has the same dimension W×L×(the number of channels). The width (W) and the length (L) is the dimension from the top view of the detected 3D space and the number of channels is the information of the position, intensity and learnt global semantic features (for RADAR it also includes range rate information).

The deep latent ensemble layer 944 combines the feature maps which produces merged or combined feature vectors. The deep latent ensemble layer 944 applies average or maximum pooling of the feature tensors (e.g., matrix) from the feature extractors 916, 924 and 928 (since they all have the same dimension W×L×(number of channels). The output from the deep latent ensemble layer 944 is provided to the DNN classifier and regressor 948. The DNN classifier regressor 948 are fully connected networks which helps in separating the data of the merged feature vectors into multiple categorical classes and continuous real values (e.g., an object's position and an object's dimension). For example, the DNN classifier regressor 928 outputs 920 the following parameters for detected objects: object classification (e.g., car, pedestrian, etc.); 3D position of the object (e.g., X,Y, Z coordinates of the object); 3D dimensions of the object (e.g., length, width, height of the object); the direction of the object (e.g., heading); and the velocity of the object.

Figure 10:
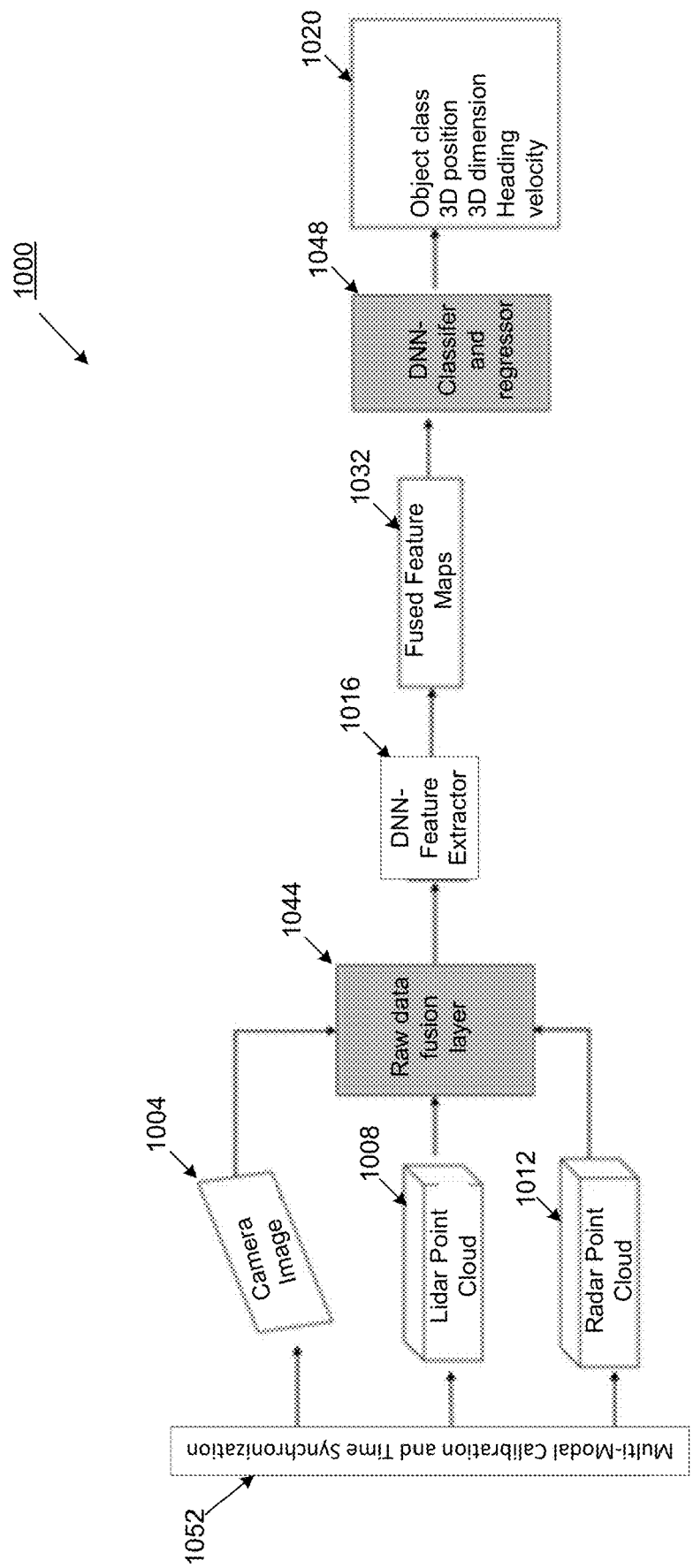
FIG. 10 is a block diagram of another example DNN architecture for fusing LiDAR, imaging RADAR and camera inputs in accordance with embodiments of the present disclosure.

FIG. 10 is a block diagram of another example DNN architecture 1000 for fusing LiDAR, imaging RADAR and camera inputs in accordance with embodiments of the present disclosure. The architecture 1000 includes multimodal calibration and time synchronization block 1052, camera image 1004 data, LiDAR point cloud 1008 data, imaging RADAR point cloud 1012 data, raw data fusion layer 1044, DNN feature extractor 1016, fused feature maps 1032, DNN classifier and regressor 1048, and output 1020. Although DNN feature extractor 1016 and DNN classifier and regressor 1048 are used in this example embodiment of the present disclosure, other complex and sophisticated algorithms can be used without departing from the spirit and scope of the present disclosure. The DNN feature extractor 1016 and the DNN classifier and regressor 1048 are stored, for example, in one or more of the processors/computers such as sensor processor(s) 340, computing device(s) 368, vehicle computing device 604, communication devices 608 and 612, CPU 708, and/or servers 614 and 616. Multi-modal calibration and time synchronization block 1052 calibrates and synchronizes each of the camera sensor 332, RADAR sensor 324 and LiDAR sensor 320 such that a single frame of each of camera image 1004 data, imaging RADAR point cloud 1008 data and LiDAR point cloud 1012 data are simultaneously captured and fused as inputs to raw data fusion layer 1044. Calibration of the camera sensor 332, RADAR sensor 324, and LiDAR sensor 320 include intrinsic and extrinsic calibration of these sensors.

Thus, the raw data fusion layer 1044 combines the raw data from each of the sensors. This is considered low-level sensor fusion (LLF). The output of the raw fusion layer 1044 is provided to the DNN feature extractor 1016. The DNN feature extractor 1016 extracts feature representations of objects from the fusion (e.g., combination) of the camera image 1004 data, imaging RADAR point cloud 1008 data, and LiDAR point cloud 1012 data. The output from the DNN feature extractor 1016 produces fused feature maps 1032 which are semantic feature representations of the detected objects. The fused feature maps are subsequently provided to the DNN classifier and regressor 1048, which outputs 1020 the following parameters for detected objects: object classification (e.g., car, pedestrian, etc.); 3D position of the object (e.g., X,Y, Z coordinates of the object); 3D dimensions of the object (e.g., length, width, height of the object); the direction of the object (e.g., heading); and the velocity of the object.

The DNN classifier and regressor 1048 is used to estimate the velocity information (object velocity from range-rate values, so that the entire architecture is end-to-end trainable). With this approach, the total loss function for the network takes the form of Equation 2 as follows:

$$L = W_{cls}L_{cls} + W_{loc}L_{loc} + W_{angle}L_{angle} + W_{velocity}L_{velocity} \quad (2)$$

Where $W_{cls}$ is the weight for classification loss; $L_{cls}$ is the object classification loss; $W_{loc}$ is the weight for 3D location prediction; $L_{loc}$ is the loss for 3D location prediction; $W_{angle}$ is the weight for heading prediction; $L_{angle}$ is loss for heading prediction; $W_{velocity}$ is the weight for velocity regression; and $L_{velocity}$ is loss of velocity of regression. According to embodiments of the present disclosure, the DNN is trained by processing many samples of input training data, and for each training sample, and adjustment is made to the internal parameters of the DNN using the total loss function. The loss function denotes the error between the predicted output generated by the network and the ground truth target information included in the training sample. After the parameters in the neural network are well trained during the prediction stage, the network outputs object class prediction, 3D position, 3D dimension, heading, and the velocity of the object.

Figure 11:
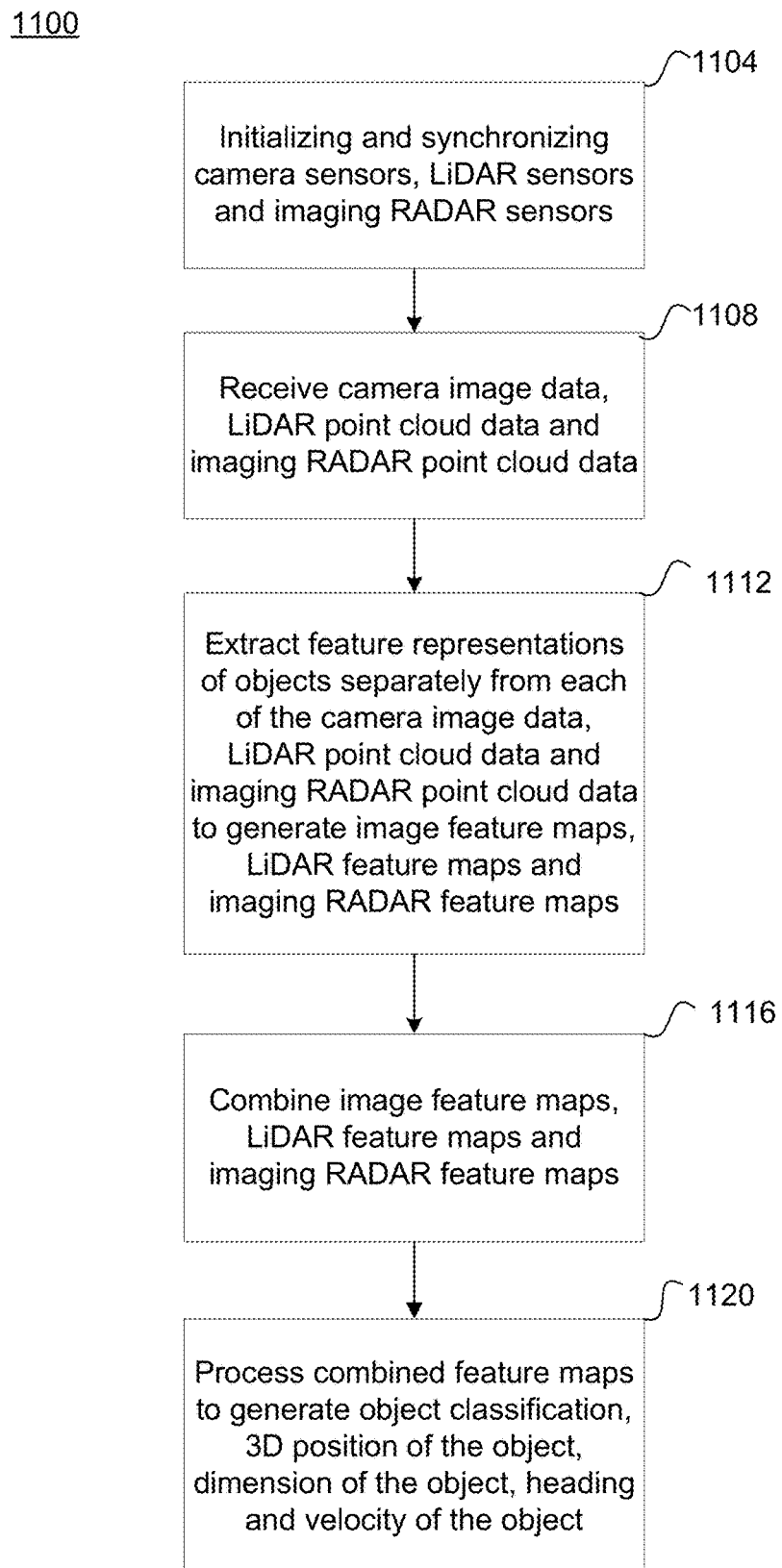
FIG. 11 is a flowchart illustrating an example process for 4D object detection by separate camera, imaging RADAR and LiDAR in accordance with embodiments of the present disclosure.

FIG. 11 is a flowchart illustrating an example process 1100 for 4D object detection by separate camera, imaging RADAR, and LiDAR in accordance with embodiments of the present disclosure. As illustrated in this example, process 1100 may include initializing and synchronizing the camera sensors 332, the LiDAR sensors 320, and the imaging RADAR sensors 324 at block 1104. One or more other sensors 304 can be used to capture geographic position information such as latitude, longitude, elevation, heading, speed, etc., and can comprise, for example, a GPS unit 308 or other sensors 304 as described above.

Once the sensor(s) have been initialized at block 1104, a control system of the vehicle, such as for example, the vehicle control system 348 receives sensor data from camera sensors 332, the LiDAR sensors 320, and the RADAR sensors 324 in the form of camera image data, LiDAR point cloud data, and imaging RADAR point cloud data at block 1108.

Using the received sensor data at block 1108, sensor processor 340 or other processors such as for example processors 604, 614 and 618 extracts feature representations of objects separately from each of the camera image data, the LiDAR point cloud data, and the imaging RADAR point cloud data to generate image feature maps, LiDAR feature maps, and RADAR feature maps at block 1112. Process 1100 continues to block 1116 where the image feature maps, LiDAR feature maps, and RADAR feature maps are combined by a deep latent ensemble layer, for example. Process 1100 continues to block 1120 where a DNN classifier and regressor processes the combined image feature maps, LiDAR feature maps, and RADAR feature maps and outputs object classification (e.g., car, pedestrian, etc.); 3D position of the object (e.g., X,Y,Z coordinates of the object); 3D dimensions of the object (e.g., length, width, height of the object); the direction of the object (e.g., heading); and the velocity of the object.

Figure 12:
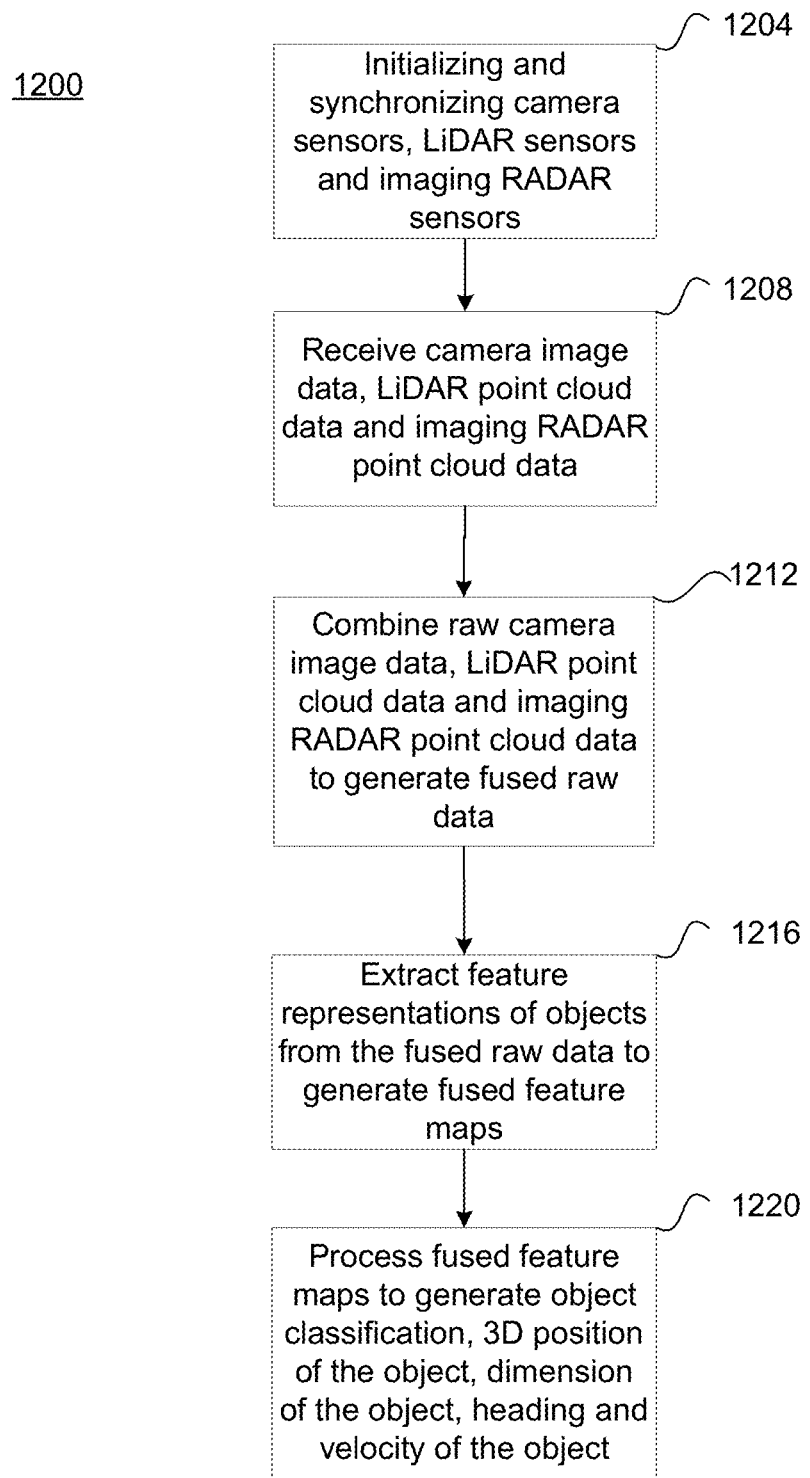
FIG. 12 is a flowchart illustrating an example process for 4D object detection by camera, imaging RADAR and LiDAR fusion in accordance with embodiments of the present disclosure.

FIG. 12 is a flowchart illustrating an example process 1100 for 4D object detection by camera, imaging RADAR, and LiDAR fusion in accordance with embodiments of the present disclosure. As illustrated in this example, process 1200 may include initializing and synchronizing the camera sensors 332, the LiDAR sensors 320, and the RADAR sensors 324 at block 1204. One or more other sensors 304 can be used to capture geographic position information such as latitude, longitude, elevation, heading, speed, etc., and can comprise, for example, a GPS unit 308 or other sensors 304 as described above.

Once the sensor(s) have been initialized at block 1204, a control system of the vehicle, such as for example, the vehicle control system 348 receives sensor data from the camera sensors 332, the LiDAR sensors 320, and the RADAR sensors 324 in the form of camera image data, LiDAR point cloud data, and imaging RADAR point cloud data at block 1208.

The received sensor data at block 1208 is combined by sensor processor 340 or other processors, such as for example, processors 604, 614, and 618, to generate fused raw data at block 1212. Sensor processor 340, for example, extracts feature representations of objects from the fused raw data to generate fused feature maps at block 1216. Process 1200 continues to block 1220 where a DNN classifier and regressor processes the fused feature maps and outputs object classification (e.g., car, pedestrian, etc.); 3D position of the object (e.g., X,Y,Z coordinates of the object); 3D dimensions of the object (e.g., length, width, height of the object); the direction of the object (e.g., heading); and the velocity of the object.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/target distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for object detection, the method comprising receiving, by a processor, sensor data indicative of one or more objects for each of a camera subsystem, a LiDAR subsystem, and an imaging RADAR subsystem, wherein the sensor data includes camera image data, LiDAR point cloud data and imaging RADAR point cloud data and the sensor data is received simultaneously and within one frame for each of the camera subsystem, the LiDAR subsystem, and the imaging RADAR subsystem, extracting, by the processor, one or more feature representations of the objects from the camera image data, LiDAR point cloud data and imaging RADAR point cloud data, generating, by the processor, image feature maps from the extracted camera image data, LiDAR feature maps from the LiDAR point cloud data and imaging RADAR feature maps from the image RADAR point cloud data, combining, by the processor, the image feature maps, the LiDAR feature maps and the imaging RADAR feature maps to generate merged feature maps and generating, by the processor, object classification, object position, object dimensions, object heading and object velocity from the merged feature maps.

Aspects of the above method include wherein each of the image feature maps, LiDAR feature maps and imaging RADAR feature maps are feature vectors that have a same dimension of width, length and a number of channels.

Aspects of the above method include wherein the processor includes a feature extractor algorithm to extract the one or more feature representations of the objects from the camera image data, LiDAR point cloud data and imaging RADAR point cloud data and a classifier and regressor algorithm to generate the object classification, the object position, the object dimensions, the object heading and the object velocity.

Aspects of the above method include wherein the feature extractor algorithm includes a Deep Neural Network (DNN) algorithm, a Histogram of Oriented Gradients (HOG) algorithm, a Scale Invariant Feature Transform (SIFT) algorithm or a Speeded-Up Robust Feature (SURF) algorithm.

Aspects of the above method include wherein the classifier and regressor algorithm includes a Deep Neural Network (DNN) algorithm, a Decision Tree (DT) algorithm or a Support Vector Machine (SVM) algorithm.

Aspects of the above method include further comprising initializing and calibrating, by the processor, sensors from each of the camera subsystem, the LiDAR subsystem, and the imaging RADAR subsystem.

Aspects of the above method include wherein calibrating the sensors from each of the camera subsystem, the LiDAR subsystem, and the imaging RADAR subsystem includes intrinsic and extrinsic calibrations.

Embodiments include a method for object detection comprising receiving, by a processor, sensor data indicative of one or more objects for each of a camera subsystem, a LiDAR subsystem, and an imaging RADAR subsystem, wherein the sensor data includes camera image data, LiDAR point cloud data and imaging RADAR point cloud data and the sensor data is received simultaneously and within one frame for each of the camera subsystem, the LiDAR subsystem, and the imaging RADAR subsystem, combining, by the processor, camera image data, LiDAR point cloud data and imaging RADAR point cloud data to create fused raw data, extracting, by the processor, one or more feature representations of the objects from the fused raw data, generating, by the processor, fused feature maps from the extracted fused raw data and generating, by the processor, object classification, object position, object dimensions, object heading and object velocity from the fused feature maps.

Aspects of the above method include wherein the processor includes a feature extractor algorithm to extract the one or more feature representations of the objects from fused raw data and a classifier and regressor algorithm to generate the object classification, the object position, the object dimensions, the object heading and the object velocity.

Aspects of the above method include wherein the feature extractor algorithm includes a Deep Neural Network (DNN) algorithm, a Histogram of Oriented Gradients (HOG) algorithm, a Scale Invariant Feature Transform (SIFT) algorithm or a Speeded-Up Robust Feature (SURF) algorithm.

Aspects of the above method include wherein the classifier and regressor algorithm includes a Deep Neural Network (DNN) algorithm, a Decision Tree (DT) algorithm or a Support Vector Machine (SVM) algorithm.

Aspects of the above method include further comprising initializing and calibrating, by the processor, sensors from each of the camera subsystem, the LiDAR subsystem, and the imaging RADAR subsystem.

Aspects of the above method include wherein calibrating the sensors from each of the camera subsystem, the LiDAR subsystem, and the imaging RADAR subsystem includes intrinsic and extrinsic calibrations.

Embodiments include a vehicle control system comprising a processor and a memory coupled with and readable by the processor and storing therein a set of instructions, which when executed by the processor, cause the processor to detect objects in a single frame by receiving sensor data indicative of one or more objects for each of a camera subsystem, a LiDAR subsystem, and an imaging RADAR subsystem, wherein the sensor data includes camera image data, LiDAR point cloud data and imaging RADAR point cloud data and the sensor data is received simultaneously and within one frame for each of the camera subsystem, the LiDAR subsystem, and the imaging RADAR subsystem, extracting one or more feature representations of the objects from the camera image data, LiDAR point cloud data and imaging RADAR point cloud data, generating image feature maps from the extracted camera image data, LiDAR feature maps from the LiDAR point cloud data and imaging RADAR feature maps from the image RADAR point cloud data, combining the image feature maps, the LiDAR feature maps and the imaging RADAR feature maps to generate merged feature maps and generating object classification, object position, object dimensions, object heading and object velocity from the merged feature maps.

Aspects of the above vehicle control system include wherein each of the image feature maps, LiDAR feature maps and imaging RADAR feature maps are feature vectors that have a same dimension of width, length and a number of channels.

Aspects of the above vehicle control system include wherein the processor includes a feature extractor algorithm to extract the one or more feature representations of the objects from the camera image data, LiDAR point cloud data and imaging RADAR point cloud data and a classifier and regressor algorithm to generate the object classification, the object position, the object dimensions, the object heading and the object velocity.

Aspects of the above vehicle control system include wherein the feature extractor algorithm includes a Deep Neural Network (DNN) algorithm, a Histogram of Oriented Gradients (HOG) algorithm, a Scale Invariant Feature Transform (SIFT) algorithm or a Speeded-Up Robust Feature (SURF) algorithm.

Aspects of the above vehicle control system include wherein the classifier and regressor algorithm includes a Deep Neural Network (DNN) algorithm, a Decision Tree (DT) algorithm or a Support Vector Machine (SVM) algorithm.

Aspects of the above vehicle control system include further comprising initializing and calibrating sensors from each of the camera subsystem, the LiDAR subsystem, and the imaging RADAR subsystem.

Aspects of the above vehicle control system include wherein calibrating the sensors from each of the camera subsystem, the LiDAR subsystem, and the imaging RADAR subsystem includes intrinsic and extrinsic calibrations.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for object detection, the method comprising:
receiving, by a processor, sensor data indicative of one or more objects for each of a camera subsystem, a LiDAR subsystem, and an imaging RADAR subsystem,
wherein the sensor data includes camera image data, LiDAR point cloud data, and imaging RADAR point cloud data, and wherein the sensor data is received simultaneously and within one frame for each of the camera subsystem, the LiDAR subsystem, and the imaging RADAR subsystem;
generating, by the processor, feature maps from one or more feature representations of objects from the camera image data, from the LiDAR point cloud data, and from the imaging RADAR point cloud data; and
generating, by the processor, object classification, object position, object dimensions, object heading, and object velocity from the feature maps.

2. The method of claim 1, wherein the processor executes a feature extractor algorithm to extract the one or more feature representations of the objects from the camera image data, LiDAR point cloud data, and imaging RADAR point cloud data, and wherein the processor executes a classifier and regressor algorithm to generate the object classification, the object position, the object dimensions, the object heading, and the object velocity.

3. The method of claim 2, wherein the feature extractor algorithm includes a Deep Neural Network (DNN) algorithm, a Histogram of Oriented Gradients (HOG) algorithm, a Scale Invariant Feature Transform (SIFT) algorithm, or a Speeded-Up Robust Feature (SURF) algorithm.

4. The method of claim 3, wherein a total loss function for the DNN algorithm is defined by $$L = W_{cls}L_{cls} + W_{loc}L_{loc} + W_{angle}L_{angle} + W_{velocity}L_{velocity}$$

where $W_{cls}$ is a weight for classification loss; $L_{cls}$ is an object classification loss; $W_{loc}$ is a weight for 3D location prediction; $L_{loc}$ is a loss for 3D location prediction; $W_{angle}$ is a weight for heading prediction; $L_{angle}$ is a loss for heading prediction; $W_{velocity}$ is a weight for velocity regression; and $L_{velocity}$ is a loss of velocity of regression.

5. The method of claim 2, wherein the classifier and regressor algorithm includes a Deep Neural Network (DNN) algorithm, a Decision Tree (DT) algorithm, or a Support Vector Machine (SVM) algorithm.

6. The method of claim 1, further comprising initializing and calibrating, by the processor, sensors from each of the camera subsystem, the LiDAR subsystem, and the imaging RADAR subsystem.

7. The method of claim 6, wherein calibrating the sensors from each of the camera subsystem, the LiDAR subsystem, and the imaging RADAR subsystem includes intrinsic and extrinsic calibrations.

8. The method of claim 1, wherein the feature maps are generated from image feature maps from the camera image data, LiDAR feature maps from the LiDAR point cloud data, and imaging RADAR feature maps from the image RADAR point cloud data.

9. The method of claim 1, wherein the feature maps are generated from extracted combined raw data from the camera image data, the LiDAR point cloud data, and the imaging RADAR point cloud data.

10. A vehicle control system, comprising:
a processor; and
a memory coupled with and readable by the processor and storing therein a set of instructions, which when executed by the processor, cause the processor to detect objects in a single frame by:
receiving sensor data indicative of one or more objects for each of a camera subsystem, a LiDAR subsystem, and an imaging RADAR subsystem;
wherein the sensor data includes camera image data, LiDAR point cloud data, and imaging RADAR point cloud data, and wherein the sensor data is received simultaneously and within one frame for each of the camera subsystem, the LiDAR subsystem, and the imaging RADAR subsystem;
generating feature maps from one or more feature representations of objects from the camera image data, from the LiDAR point cloud data, and from the imaging RADAR point cloud data; and
generating object classification, object position, object dimensions, object heading, and object velocity from the feature maps.

11. The vehicle control system of claim 10, wherein the processor executes a feature extractor algorithm stored on the memory to extract the one or more feature representations of the objects from the camera image data, LiDAR point cloud data and imaging RADAR point cloud data, and wherein the processor executes a classifier and regressor algorithm stored on the memory to generate the object classification, the object position, the object dimensions, the object heading, and the object velocity.

12. The vehicle control system of claim 11, wherein the feature extractor algorithm includes a Deep Neural Network (DNN) algorithm, a Histogram of Oriented Gradients (HOG) algorithm, a Scale Invariant Feature Transform (SIFT) algorithm, or a Speeded-Up Robust Feature (SURF) algorithm.

13. The vehicle control system of claim 12, wherein a total loss function for the DNN algorithm is defined by $$L = W_{cls}L_{cls} + W_{loc}L_{loc} + W_{angle}L_{angle} + W_{velocity}L_{velocity}$$

where $W_{cls}$ is a weight for classification loss; $L_{cls}$ is an object classification loss; $W_{loc}$ is a weight for 3D location prediction; $L_{loc}$ is a loss for 3D location prediction; $W_{angle}$ is a weight for heading prediction; $L_{angle}$ is a loss for heading prediction; $W_{velocity}$ is a weight for velocity regression; and $L_{velocity}$ is a loss of velocity of regression.

14. The vehicle control system of claim 11, wherein the classifier and regressor algorithm includes a Deep Neural Network (DNN) algorithm, a Decision Tree (DT) algorithm, or a Support Vector Machine (SVM) algorithm.

15. The vehicle control system of claim 10, further comprising initializing and calibrating, by the processor, sensors from each of the camera subsystem, the LiDAR subsystem, and the imaging RADAR subsystem.

16. The vehicle control system of claim 15, wherein calibrating the sensors from each of the camera subsystem, the LiDAR subsystem, and the imaging RADAR subsystem includes intrinsic and extrinsic calibrations.

17. The vehicle control system of claim 10, wherein the feature maps are generated from image feature maps from the camera image data, LiDAR feature maps from the LiDAR point cloud data, and imaging RADAR feature maps from the image RADAR point cloud data.

18. The vehicle control system of claim 10, wherein the feature maps are generated from extracted combined raw data from the camera image data, the LiDAR point cloud data, and the imaging RADAR point cloud data.

19. A vehicle control system, comprising:
a processor; and
a memory coupled with and readable by the processor and storing therein a set of instructions, which when executed by the processor, cause the processor to detect objects in a single frame by:
receiving sensor data indicative of one or more objects for each of a camera subsystem, a LiDAR subsystem, and an imaging RADAR subsystem;
wherein the sensor data includes camera image data, LiDAR point cloud data, and imaging RADAR point cloud data, and wherein the sensor data is received simultaneously and within one frame for each of the camera subsystem, the LiDAR subsystem, and the imaging RADAR subsystem;
combining the camera image data, the LiDAR point cloud data, and the imaging RADAR point cloud data to create fused raw data;
extracting one or more feature representations of the objects from the fused raw data;
generating fused feature maps from the extracted one or more feature representations of the objects from the fused raw data; and
generating object classification, object position, object dimensions, object heading, and object velocity from the fused feature maps.

20. The vehicle control system of claim 19, wherein the processor executes a feature extractor algorithm to extract the one or more feature representations of the objects from the fused raw data, and wherein the processor executes a classifier and regressor algorithm to generate the object classification, the object position, the object dimensions, the object heading, and the object velocity.

\* \* \* \* \*